United States Patent
Nazarpoor et al.

(10) Patent No.: US 9,511,355 B2
(45) Date of Patent: *Dec. 6, 2016

(54) SYSTEM AND METHODS FOR USING SYNERGIZED PGM AS A THREE-WAY CATALYST

(71) Applicant: CLEAN DIESEL TECHNOLOGIES, INC., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc. (CDTI), Oxnard, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/090,861

(22) Filed: Nov. 26, 2013

(65) Prior Publication Data

US 2015/0148223 A1    May 28, 2015

(51) Int. Cl.
*B01J 23/89* (2006.01)
*B01D 53/94* (2006.01)
(Continued)

(52) U.S. Cl.
CPC .......... *B01J 23/8986* (2013.01); *B01D 53/945* (2013.01); *B01J 23/005* (2013.01);
(Continued)

(58) Field of Classification Search
CPC ........................... B01J 23/8986; B01J 23/8892
(Continued)

(56) References Cited

U.S. PATENT DOCUMENTS 3,284,370 A   11/1966   Alan et al.
3,473,987 A   10/1969   Sowards
(Continued)

FOREIGN PATENT DOCUMENTS

CH    644637 A5    8/1984
CN    102172527    9/2011
(Continued)

OTHER PUBLICATIONS

Alini, S. et al., *Development of new catalysts for $N_2O$-decomposition from adipic acid plant*, Applied Catalysis B: Environmental, 70, (2007) 323-329.
(Continued)

*Primary Examiner* — Anthony J Zimmer
(74) *Attorney, Agent, or Firm* — Alston & Bird LLP

(57) ABSTRACT

Synergies resulting from combinations of catalyst systems including Copper-Manganese material compositions and PGM catalysts are disclosed. Variations of catalyst system configurations are tested to determine most effective material composition, formulation, and configuration for an optimal synergized PGM (SPGM) catalyst system. The synergistic effect of the selected SPGM catalyst system is determined under steady state and oscillating test conditions, from which the optimal NO/CO cross over R-value indicates enhanced catalytic behavior of the selected SPGM catalyst system as compared with current PGM catalysts for TWC applications. According to principles in the present disclosure, application of Pd on alumina-based support as overcoat and Cu—Mn spinel structure supported on $Nb_2O_5$—$ZrO_2$ as washcoat on suitable ceramic substrate, produce higher catalytic activity, efficiency, and better performance in TWC condition, especially under lean condition, than commercial PGM catalysts.

20 Claims, 12 Drawing Sheets

(51) Int. Cl.
*B01J 23/00* (2006.01)
*B01J 23/889* (2006.01)
*B01J 37/02* (2006.01)
*B01J 37/03* (2006.01)

(52) U.S. Cl.
CPC ....... *B01J 23/8892* (2013.01); *B01J 37/0244* (2013.01); *B01D 2255/1021* (2013.01); *B01D 2255/1023* (2013.01); *B01D 2255/1025* (2013.01); *B01D 2255/2073* (2013.01); *B01D 2255/20715* (2013.01); *B01D 2255/20761* (2013.01); *B01D 2255/405* (2013.01); *B01D 2255/908* (2013.01); *B01D 2255/9022* (2013.01); *B01D 2258/012* (2013.01); *B01J 37/035* (2013.01); *B01J 37/038* (2013.01); *B01J 2523/00* (2013.01)

(58) Field of Classification Search
USPC .................................................. 502/300–355
See application file for complete search history.

(56) References Cited

U.S. PATENT DOCUMENTS

| | | | |
|---|---|---|---|
| 3,493,325 A | 2/1970 | Roth |
| 3,896,616 A | 7/1975 | Keith et al. |
| 3,904,553 A | 9/1975 | Campbell et al. |
| 4,029,738 A | 6/1977 | Courty et al. |
| 4,062,810 A | 12/1977 | Vogt et al. |
| 4,113,921 A | 9/1978 | Goldstein et al. |
| 4,188,309 A | 2/1980 | Volker et al. |
| 4,199,328 A | 4/1980 | Cole et al. |
| 4,261,862 A | 4/1981 | Kinoshita et al. |
| 4,274,981 A | 6/1981 | Suzuki et al. |
| 4,297,150 A | 10/1981 | Sims et al. |
| 4,297,328 A | 10/1981 | Ritscher et al. |
| 4,414,023 A | 11/1983 | Aggen et al. |
| 4,661,329 A | 4/1987 | Suzuki et al. |
| 4,673,556 A | 6/1987 | McCabe et al. |
| 4,790,982 A | 12/1988 | Yoo et al. |
| 4,797,329 A | 1/1989 | Kilbane et al. |
| 4,885,269 A | 12/1989 | Cyron |
| 4,906,443 A | 3/1990 | Gandhi et al. |
| 5,063,193 A | 11/1991 | Bedford et al. |
| 5,157,007 A | 10/1992 | Domesle et al. |
| 5,162,284 A | 11/1992 | Soled et al. |
| 5,175,132 A | 12/1992 | Ketcham et al. |
| 5,182,249 A | 1/1993 | Wang et al. |
| 5,238,898 A | 8/1993 | Han et al. |
| 5,364,517 A | 11/1994 | Dieckmann et al. |
| 5,371,056 A | 12/1994 | Leyrer et al. |
| 5,580,553 A | 12/1996 | Nakajima |
| 5,658,543 A | 8/1997 | Yoshida et al. |
| 5,708,233 A | 1/1998 | Ochi et al. |
| 5,721,188 A | 2/1998 | Sung et al. |
| 5,747,410 A | 5/1998 | Muramatsu et al. |
| 5,879,645 A | 3/1999 | Park et al. |
| 5,898,015 A | 4/1999 | Yokoi et al. |
| 5,965,099 A | 10/1999 | Hartweg et al. |
| 5,968,462 A | 10/1999 | Suzuki |
| 6,129,834 A | 10/2000 | Peters et al. |
| 6,232,253 B1 | 5/2001 | Narula et al. |
| 6,293,096 B1 | 9/2001 | Khair et al. |
| 6,372,686 B1 | 4/2002 | Golden |
| 6,395,244 B1 | 5/2002 | Hartweg et al. |
| 6,444,178 B1 | 9/2002 | Haratweg et al. |
| 6,468,941 B1 * | 10/2002 | Bortun ................ B01D 53/945 502/300 |
| 6,576,587 B2 | 6/2003 | Labarge et al. |
| 6,605,264 B2 * | 8/2003 | Bortun ................ B01D 53/945 423/219 |
| 6,624,113 B2 | 9/2003 | Labarge et al. |
| 6,632,557 B1 | 10/2003 | Curelop et al. |
| 6,652,829 B2 | 11/2003 | Barnes et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,858,193 B2 | 2/2005 | Ruwisch et al. |
| 6,915,629 B2 | 7/2005 | Szymkowics |
| 6,938,411 B2 | 9/2005 | Hoffmann et al. |
| 7,129,194 B2 | 10/2006 | Baca et al. |
| 7,374,729 B2 | 5/2008 | Chen et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,785,544 B2 | 8/2010 | Alward et al. |
| 7,803,338 B2 | 9/2010 | Socha et al. |
| 7,875,250 B2 | 1/2011 | Nunan |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,845,987 B1 | 9/2014 | Nazarpoor et al. |
| 8,853,121 B1 | 10/2014 | Nazarpoor et al. |
| 8,858,903 B2 | 10/2014 | Nazarpoor |
| 8,969,228 B2 | 3/2015 | Nazarpoor et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 | 3/2004 | Curlop et al. |
| 2004/0087439 A1 | 5/2004 | Hwang et al. |
| 2004/0151647 A1 | 8/2004 | Wanninger et al. |
| 2004/0166035 A1 | 8/2004 | Noda et al. |
| 2004/0254062 A1 | 12/2004 | Crocker et al. |
| 2005/0095188 A1 | 5/2005 | Matsumoto et al. |
| 2005/0145827 A1 | 7/2005 | McCabe et al. |
| 2005/0197244 A1 | 9/2005 | L'vovich et al. |
| 2005/0207956 A1 | 9/2005 | Vierheilig |
| 2005/0227867 A1 | 10/2005 | Chen et al. |
| 2005/0265920 A1 | 12/2005 | Ercan et al. |
| 2006/0100097 A1 | 5/2006 | Chigapov et al. |
| 2006/0120936 A1 | 6/2006 | Alive et al. |
| 2006/0223694 A1 | 10/2006 | Gandhi et al. |
| 2006/0228283 A1 | 10/2006 | Malyala et al. |
| 2006/0292342 A1 | 12/2006 | Ohno et al. |
| 2008/0072705 A1 | 3/2008 | Chaumonnot et al. |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |
| 2008/0190099 A1 | 8/2008 | Yezerets et al. |
| 2009/0134365 A1 | 5/2009 | Sasaki et al. |
| 2009/0220697 A1 | 9/2009 | Addiego |
| 2009/0274903 A1 | 11/2009 | Addiego |
| 2009/0324468 A1 | 12/2009 | Golden et al. |
| 2009/0324469 A1 | 12/2009 | Golden et al. |
| 2009/0324470 A1 | 12/2009 | Alamdari et al. |
| 2010/0062293 A1 | 3/2010 | Triantafyllopoulous et al. |
| 2010/0081563 A1 | 4/2010 | Edgar-Beltran et al. |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1 | 8/2010 | Ryu et al. |
| 2010/0229533 A1 | 9/2010 | Li et al. |
| 2010/0233045 A1 | 9/2010 | Kim et al. |
| 2010/0240525 A1 | 9/2010 | Golden et al. |
| 2010/0266473 A1 | 10/2010 | Chen et al. |
| 2010/0290964 A1 | 11/2010 | Southward et al. |
| 2010/0293929 A1 | 11/2010 | Zhan et al. |

(56) References Cited

U.S. PATENT DOCUMENTS

| | | |
|---|---|---|
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1 | 5/2013 | Kuo et al. |
| 2013/0172177 A1 | 7/2013 | Domke et al. |
| 2013/0189173 A1 | 7/2013 | Hilgendorff |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0301909 A1 | 10/2014 | Nazarpoor |
| 2014/0301931 A1 | 10/2014 | Nazarpoor |
| 2014/0302983 A1 | 10/2014 | Nazarpoor |
| 2014/0334989 A1 | 11/2014 | Nazarpoor et al. |
| 2014/0334990 A1 | 11/2014 | Nazarpoor |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2015/0005157 A1 | 1/2015 | Nazarpoor et al. |
| 2015/0005158 A1 | 1/2015 | Nazarpoor et al. |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0238940 A1 | 8/2015 | Nazarpoor et al. |
| 2015/0238941 A1 | 8/2015 | Nazarpoor et al. |
| 2015/0290627 A1 | 10/2015 | Nazarpoor et al. |

FOREIGN PATENT DOCUMENTS

| | | |
|---|---|---|
| CN | 102371153 | 3/2012 |
| EP | 0022349 | 1/1981 |
| EP | 0450897 | 10/1991 |
| EP | 0541271 | 5/1993 |
| EP | 0605142 | 7/1994 |
| EP | 0 814 241 | 12/1997 |
| EP | 1121981 | 8/2001 |
| EP | 1 232 790 | 8/2002 |
| EP | 1 256 382 | 11/2002 |
| EP | 1 656 993 | 5/2006 |
| EP | 2441510 | 4/2012 |
| JP | 62-20613 | 1/1987 |
| JP | 4-215853 | 8/1992 |
| JP | 09-271665 | 10/1997 |
| JP | 4144174 | 9/2008 |
| JP | 2013-27858 | 2/2013 |
| PL | 404146 | 12/2014 |
| WO | WO 2008/099847 | 8/2008 |
| WO | WO 2010/029431 | 3/2010 |
| WO | WO 2012/166514 | 12/2012 |
| WO | WO 2013/004814 | 1/2013 |
| WO | WO 2013/028575 | 2/2013 |
| WO | WO 2013/044115 | 3/2013 |
| WO | WO 2013/068243 | 5/2013 |
| WO | WO 2013/121112 | 8/2013 |
| WO | WO 2013/153081 | 10/2013 |

OTHER PUBLICATIONS

Azad et al. *Examining the Cu—Mn—O Spinel System as an Oxygen Carrier in Chemical Looping Combustion*, Energy Technology, vol. 1, Issue 1, (2013) 59-69.

Barrett, E. P. et al., *The determination of pore volume and area distributions in porous substances. I. Computations from nitrogen isotherms*, J. A. Chem. Soc. (1951) 73, 373-380.

Brunaubr, S. et al., *Adsorption of Gases in Multimolecular Layers*, J. Am. Chem. Soc. 1938, 60, 309-319.

Bugarski, Aleksandar, *Exhaust Aftertreatment Technologies for Curtailment of Diesel Particulate Matter and Gaseous Emissions*, Disesel Aerosols and Gases in Underground Metal and Nonmetal Mines. Power Point Presentation. 14th U.S./North American Mine Ventilation Symposium, Salt Lake City, Utah, Jun. 17, 2012. Slides 1-44. http://www.cdc.gov/niosh/mining/use.

D. Panayotov, "Interaction Between NO, Co and O2 ON gamma-Al2O3-Supported Copper-Manganese Oxides", 1996, React.Kinet.Catal.Lett. vol. 58, No. 1, 73-78.

Extended European Search Report for corresponding European Application No. 09770546.1 dated Sep. 26, 2012, 6 pages.

Extended European Search Report for corresponding European Application No. 09770547.9 dated Dec. 7, 2012, 5 pages.

Hayes et al., "Introduction to Catalytic Combustion", pp. 310-313, 1997 OPA (Overseas Publishers Association).

He, H. et al., *An investigation of NO/Co reaction over perovskite-type oxide La0.8Ce0.2B0.4Mn0.6O3 (B=Cu or Ag) catalysts synthesized by reverse microemulsion*, Catalysis Today, vol. 126 (2007) 290-295.

International Preliminary Report on Patentability (Chapter II) from International Application No. PCT/US2009/003800, dated May 11, 2010.

International Search Report and Written Opinion for corresponding International Application No. PCT/US2009/003799, dated Oct. 8, 2009.

International Search Report and Written Opinion for corresponding International Application No. PCT/US2009/003800 dated Oct. 22, 2009.

International Search Report and Written Opinion for corresponding International Application No. PCT/US2014/030597 dated Aug. 13, 2014.

International Search Report and Written Opinion for corresponding International Application No. PCT/US2014/033041 dated Aug. 20, 2014.

International Search Report and Written Opinion for corresponding International Application No. PCT/US2014/037452 dated Sep. 15, 2014.

International Search Report and Written Opinion for corresponding International Application No. PCT/US2014/044221, dated Oct. 3, 2014.

International Search Report and Written Opinion for corresponding International Application No. PCT/US2014/044222 dated Oct. 3, 2014.

International Search Report and Written Opinion for corresponding International Application No. PCT/US2014/046512 dated Apr. 6, 2015.

(56) References Cited

OTHER PUBLICATIONS

International Search Report and Written Opinion for corresponding International Application No. PCT/US2014/054874, dated Nov. 13, 2014.
International Search Report and Written Opinion for corresponding International Application No. PCT/US2014/055063 dated Nov. 24, 2014.
International Search Report and Written Opinion for corresponding International Application No. PCT/US2014/067541 dated Feb. 4, 2015.
International Search Report and Written Opinion for corresponding International Application No. PCT/US2014/067569, dated Apr. 3, 2015.
International Search Report and Written Opinion for corresponding International Application No. PCT/US2014/067589, dated Feb. 10, 2015.
International Search Report and Written Opinion for corresponding International Application No. PCT/US2015/025267 dated Jul. 2, 2015.
International Search Report and Written Opinion for corresponding International Application No. PCT/US2015/025299 dated Jul. 2, 2015.
K. S. Abdel Halim et al. "Catalytic Oxidation of Co Gas over Nanocrystallite $CuxMn1-xFe2O4$", Feb. 26, 2008, Top Catalyst (2008) 47:66-72.
Kucharczyk, B. et al., *Partial substitution of lanthanum with silver in the $LaMnO3$ perovskite: Effect of the modification on the activity of monolithic catalysts in the reactions of methane and carbon oxide oxidation*, Applied Catalysis A: General, vol. 335 (2008) 28-36.
Mestres, L. et al., *Phase Diagram at Low Temperature of the System $ZrO2/Nb2O5$*, Z.Anorg. Alig. Chem., vol. 627 (2001) 294-298.
Papavasilious et al., "Combined Steam reforming of methanol over Cu—Mn spinel oxide catalysts", Journal of Catalysis 251 (2007) 7-20.
Reddy et al., *Selective Ortho-Methylation of Phenol with Methanol over Copper Manganese Mixed-Oxide Spinel Catalysts*, Journal of Catalysis, vol. 243 (2006) 278-291.
Suh, J. K. et al., *Characterization of transition metal-impregnated La—Al complex oxides for catalytic combustion*, Microporous Materials (1995) 657-664.
Tanaka et al., "Influence of preparation method and additive for Cu—Mn spinel oxide catalyst on water gas shift reaction of reformed fuels", Applied Catalysis A: General 279 (2005) 59-66.
Wei, P. et al., *In situ high-temperature X-ray and neutron diffraction of Cu—Mn oxide phases*, J. Mater Sci. (2010) 45: 1056-1064.

* cited by examiner

SYSTEM AND METHODS FOR USING SYNERGIZED PGM AS A THREE-WAY CATALYST

CROSS-REFERENCE TO RELATED APPLICATIONS

The present disclosure is related to U.S. patent application entitled "Oxygen Storage Capacity and Thermal Stability of Synergized PGM Catalyst Systems", and U.S. patent application entitled "Method for Improving Lean performance of PGM Catalyst Systems: Synergized PGM", as well as U.S. patent application entitled "Systems and Methods for Managing a Synergistic Relationship between PGM and Copper-Manganese in a Three Way Catalyst Systems", all filed Nov. 26, 2013, the entireties of which are incorporated by reference as if fully set forth herein.

BACKGROUND

1. Field of the Disclosure

This disclosure relates generally to three-way catalyst (TWC) systems and, more particularly, to the TWC property of synergized PGM catalysts.

2. Background Information

Many modern functional materials are made of multiphase entities in which cooperative behavior between different components is required to obtain optimal performance. Typical situations of cooperative behavior are modern TWC systems utilized in vehicle exhausts to reduce exhaust gas emissions. TWC systems convert the three main pollutants in vehicle exhaust, carbon monoxide (CO), unburnt hydrocarbons (HC) and oxides of nitrogen ($NO_x$), to $H_2O$, $CO_2$ and nitrogen. Typical TWC systems include a support of alumina upon which both platinum group metals (PGM) material and promoting oxides are deposited. Key to the desired catalytic conversions is the structure-reactivity interplay between the promoting oxide and the PGM metals, in particular regarding the storage/release of oxygen under process conditions.

Current TWCs are exposed to high operation temperatures due to the use of closed-loop coupled catalysts near the engine. Additionally, TWC's demand for PGM and rare earth metals continues to increase due to their efficiency in removing pollutants from internal combustion engine exhausts, placing at the same time a strain on the supply of PGM metals, which drives up their cost and the cost of catalysts applications.

As PGM catalysts usually work close to stoichiometric condition, it is desirable to increase their activity under lean condition close to stoichiometric condition. Under lean condition $NO_x$ conversion may be increased by synergizing PGM. This synergistic effect improves fuel consumption and provides fuel economy. For the foregoing reasons, there is a need for combined catalyst systems that may exhibit optimal synergistic behavior yielding enhanced activity and performance and up to the theoretical limit in real catalysts.

SUMMARY

It is an object of the present disclosure to provide a PGM catalyst including palladium (Pd) which may be synergized adding a $Cu_{1.0}Mn_{2.0}O_4$ spinel to increase TWC property of PGM catalysts specially under lean condition, and for optimal performance of catalyst systems in TWC condition.

According to one embodiment, a catalyst system may include a substrate, a washcoat (WC) layer, an overcoat (OC) layer, and an impregnation layer. The optimized catalyst system may be achieved after application of a $Cu_{1.0}Mn_{2.0}O_4$ stoichiometric spinel with Niobium-Zirconia support oxide in a plurality of catalyst configurations including variations of washcoat (WC) layer, overcoat (OC) layer, or impregnation (IM) layer using PGM catalyst with an alumina-based support. Both, PGM catalyst on an alumina-based support and $Cu_{1.0}Mn_{2.0}O_4$ spinel with Niobium-Zirconia support oxide, may be prepared using a suitable synthesis method as known in the art.

According to embodiments in the present disclosure, a synergized PGM (SPGM) catalyst system may be configured with a WC layer including Cu—Mn stoichiometric spinel with Niobium-Zirconia support oxide, an OC layer including PGM catalyst with alumina-based support, and suitable ceramic substrate; or a WC layer including PGM catalyst with alumina-based support, an OC layer including Cu—Mn stoichiometric spinel with Niobium-Zirconia support oxide, and suitable ceramic substrate; or a WC layer with alumina-based support only, an OC layer including Cu—Mn stoichiometric spinel with Niobium-Zirconia support oxide, an IM layer including PGM, Pd in present disclosure, and suitable ceramic substrate; or a WC layer only, including Cu—Mn stoichiometric spinel with Niobium-Zirconia support oxide co-milled with PGM/alumina and suitable ceramic substrate.

The optimal NO/CO cross over R-value of disclosed SPGM catalyst system may be determined by performing isothermal steady state sweep test, employing fresh and hydrothermally aged catalyst samples prepared according to embodiments in the present disclosure. The steady state test may be developed at a selected inlet temperature using an 11-point R-value from rich condition to lean condition at a plurality of space velocities. Results from isothermal steady state test may be compared to show the optimal composition and configuration of the disclosed SPGM catalyst system for optimal performance under TWC condition, particularly under lean condition to reduce fuel consumption using the disclosed SPGM catalyst system.

According to an embodiment, TWC standard light-off test may be performed, under steady state and oscillating condition, at selected R-value of NO/CO cross over which may produce enhanced catalytic performance in NO, CO, and HC conversion.

It may be found from the present disclosure that although the catalytic activity, and thermal stability of a catalyst during real use may be affected by factors such as the chemical composition of the catalyst, as PGM catalysts usually work close to stoichiometric condition, it is desirable to increase catalyst activity under lean condition close to stoichiometric condition. Under lean condition $NO_x$ conversion may be increased by synergizing PGM catalysts. This synergistic effect on PGM catalyst may improve fuel consumption and provide fuel economy. The TWC property of the disclosed SPGM catalyst system may provide an indication that for catalyst applications, and, more particularly, for catalyst systems operating under lean condition close to stoichiometric condition, the chemical composition of the disclosed SPGM catalyst system may be more efficient operationally-wise, and from a catalyst manufacturer's viewpoint, an essential advantage given the economic factors involved.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
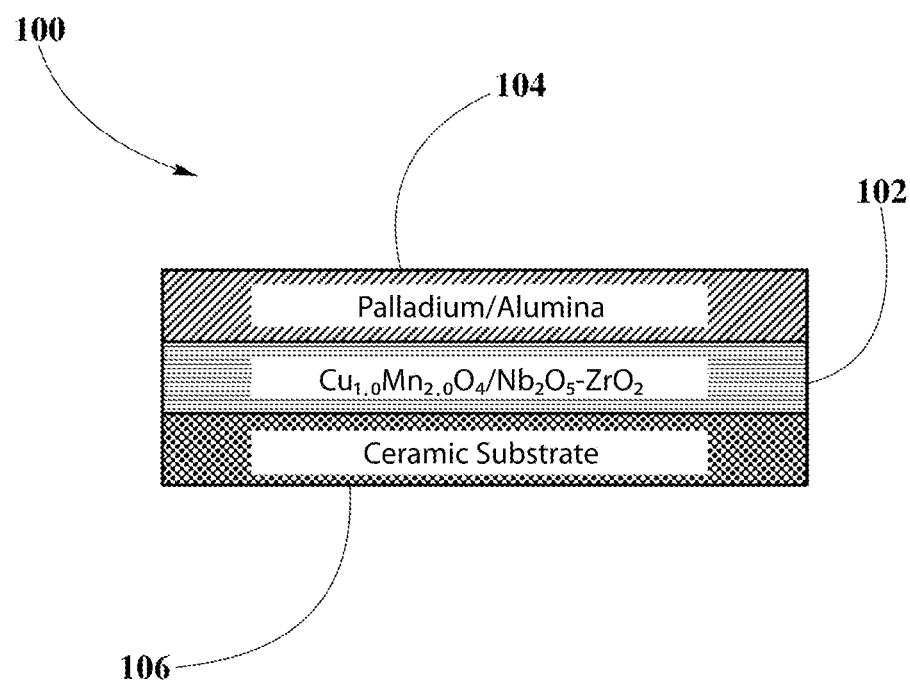
FIG. 1 shows a SPGM catalyst system configuration referred as SPGM catalyst system Type 1, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group metal (PGM)" refers to platinum, palladium, ruthenium, iridium, osmium, and rhodium.

"Synergized platinum group metal (SPGM) catalyst" refers to a PGM catalyst system which is synergized by a non-PGM group metal compound under different configuration.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat or impregnation layer.

"Catalyst system" refers to a system of at least two layers including at least one substrate, a washcoat, and/or an overcoat.

"Milling" refers to the operation of breaking a solid material into a desired grain or particle size.

"Co-precipitation" refers to the carrying down by a precipitate of substances normally soluble under the conditions employed.

"Impregnation" refers to the process of imbuing or saturating a solid layer with a liquid compound or the diffusion of some element through a medium or substance.

"Treating, treated, or treatment" refers to drying, firing, heating, evaporating, calcining, or mixtures thereof.

"Calcination" refers to a thermal treatment process applied to solid materials, in presence of air, to bring about a thermal decomposition, phase transition, or removal of a volatile fraction at temperatures below the melting point of the solid materials.

"Air/Fuel ratio or A/F ratio" refers to the weight of air divided by the weight of fuel.

"R value" refers to the number obtained by dividing the reducing potential by the oxidizing potential of materials in a catalyst. The reaction may be considered as stoichiometric when R equals 1.

"Rich condition" refers to exhaust gas condition with an R value above 1.

"Lean condition" refers to exhaust gas condition with an R value below 1.

"Three-Way Catalyst" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"$T_{50}$" may refer to the temperature at which 50% of a material is converted.

"Conversion" refers to the chemical alteration of at least one material into one or more other materials.

DESCRIPTION OF THE DRAWINGS

The present disclosure may generally provide a synergized PGM (SPGM) catalyst system having enhanced catalytic performance and thermal stability, incorporating more active components into phase materials possessing three-way catalyst (TWC) properties, such as improved oxygen mobility, to enhance the catalytic activity of the disclosed SPGM catalyst system.

According to embodiments in the present disclosure, SPGM catalyst systems may be configured with a washcoat (WC) layer including Cu—Mn stoichiometric spinel with Niobium-Zirconia support oxide, an overcoat (OC) layer including a PGM catalyst of palladium (Pd) with alumina-based support, and suitable ceramic substrate, here referred as SPGM catalyst system Type 1; or a WC layer including PGM catalyst of Pd with alumina-based support, an OC layer including Cu—Mn stoichiometric spinel with Niobium-Zirconia support oxide, and suitable ceramic substrate, here referred as SPGM catalyst system Type 2; or a WC layer with alumina-based support only, an OC layer including Cu—Mn stoichiometric spinel with Niobium-Zirconia support oxide, an impregnation (IM) layer including PGM, Pd in present disclosure, and suitable ceramic substrate, here referred as SPGM catalyst system Type 3; or a WC layer only, including Cu—Mn stoichiometric spinel with Niobium-Zirconia support oxide milled with a slurry including Pd and alumina and suitable ceramic substrate, here referred as SPGM catalyst system Type 4.

SPGM Catalyst System Configuration, Material Composition, and Preparation

FIG. 1 shows catalyst structure 100 for SPGM catalyst system Type 1. In this system configuration, WC layer 102 may include Cu—Mn spinel structure, $Cu_{1.0}Mn_{2.0}O_4$, supported on $Nb_2O_5$—$ZrO_2$ by using co-precipitation method or any other preparation technique known in the art.

The preparation of WC layer 102 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on $Nb_2O_5$—$ZrO_2$ support oxide aqueous slurry, which may have added thereto an appropriate base solution, such as in order to adjust the pH of the slurry to a suitable range. The precipitated slurry may be aged for a period of time of about 12 to 24 hours under continued stirring at room temperature.

Subsequently, the precipitated slurry may be coated on ceramic substrate 106, using a cordierite material with honeycomb structure, where ceramic substrate 106 may have a plurality of channels with suitable porosity. The aqueous slurry of Cu—Mn/$Nb_2O_5$—ZrO2 may be deposited on ceramic substrate 106 to form WC layer 102, employing vacuum dosing and coating systems. In the present disclosure, a plurality of capacities of WC loadings may be coated on ceramic substrate 106. The plurality of WC loading may vary from about 60 g/L to about 200 g/L, in this disclosure particularly about 120 g/L. Subsequently, after deposition on ceramic substrate 106 of suitable loadings of Cu—Mn/$Nb_2O_5$—ZrO2 slurry, WC layer 102 may be dried and subsequently calcined at suitable temperature within a range of about 550° C. to about 650° C., preferably at about 600° C. for about 5 hours. Treatment of WC layer 102 may be enabled employing suitable drying and heating processes. A commercially-available air knife drying systems may be employed for drying WC layer 102. Heat treatments (calcination) may be performed using commercially-available firing (furnace) systems.

WC layer 102 deposited on ceramic substrate 106 may have a chemical composition with a total loading of about 120 g/L, including a Cu—Mn spinel structure with copper loading of about 10 g/L to about 15 g/L and manganese loading of about 20 g/L to about 25 g/L. The $Nb_2O_5$—$ZrO_2$ support oxide may have loadings of about 80 g/L to about 90 g/L.

OC layer 104 may include a combination of Pd on alumina-based support. The preparation of OC layer 104 may begin by milling the alumina-based support oxide separately to make an aqueous slurry. Subsequently, a solution of Pd nitrate may then be mixed with the aqueous slurry of alumina with a loading within a range from about 0.5 g/ft$^3$ to about 10 g/ft$^3$. In the present embodiment, Pd loading is about 6 g/ft$^3$ and total loading of WC material is 120 g/L. After mixing of Pd and alumina slurry, Pd may be locked down with an appropriate amount of one or more base solutions, such as sodium hydroxide (NaOH) solution, sodium carbonate ($Na_2CO_3$) solution, ammonium hydroxide ($NH_4OH$) solution, and tetraethyl ammonium hydroxide (TEAH) solution, amongst others. No pH adjustment may be required. In the present embodiment, Pd may be locked down using a base solution of tetraethyl ammonium hydroxide (TEAH). Then the resulting slurry may be aged from about 12 hours to about 24 hours for subsequent coating as an overcoat on WC layer 102, dry and fired at about 550° C. for about 4 hours.

Figure 2:
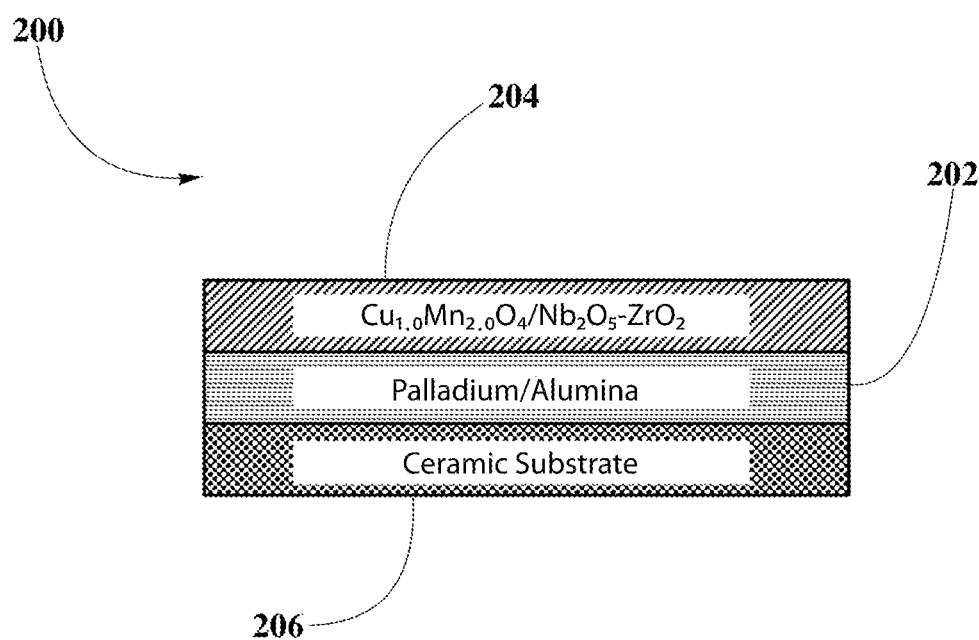
FIG. 2 illustrates a SPGM catalyst system configuration referred as SPGM catalyst system Type 2, according to an embodiment.

FIG. 2 illustrates catalyst structure 200 for SPGM catalyst system Type 2. In this system configuration, WC layer 202 may include a combination of Pd on alumina-based support. The preparation of WC layer 202 may begin by milling the alumina-based support oxide separately to make an aqueous slurry. Subsequently, a solution of Pd nitrate may then be mixed with the aqueous slurry of alumina with a loading within a range from about 0.5 g/ft$^3$ to about 10 g/ft$^3$. In the present embodiment, Pd loading is about 6 g/ft$^3$ and total loading of WC material is 120 g/L. After mixing of Pd and alumina slurry, Pd may be locked down with an appropriate amount of one or more base solutions, such as sodium hydroxide (NaOH) solution, sodium carbonate ($Na_2CO_3$) solution, ammonium hydroxide ($NH_4OH$) solution, and tetraethyl ammonium hydroxide (TEAH) solution, amongst others. No pH adjustment is required. In the present embodiment, Pd may be locked down using a base solution of tetraethyl ammonium hydroxide (TEAH). Then the resulting slurry may be aged from about 12 hours to about 24 hours for subsequent coating as WC layer 202 on ceramic substrate 206, using a cordierite material with honeycomb structure, where ceramic substrate 106 may have a plurality of channels with suitable porosity, dry and fired at about 550° C. for about 4 hours. WC layer 202 may be deposited on ceramic substrate 106 employing vacuum dosing and coating systems.

OC layer 204 may include Cu—Mn stoichiometric spinel structure, $Cu_{1.0}Mn_{2.0}O_4$, supported on $Nb_2O_5$—$ZrO_2$ by using co-precipitation method or any other preparation technique known in the art.

The preparation of OC layer 204 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on $Nb_2O_5$—$ZrO_2$ support oxide aqueous slurry, which may have added thereto an appropriate base solution, such as in order to adjust the pH of the slurry to a suitable range. The precipitated slurry may be aged for a period of time of about 12 to 24 hours under continued stirring at room temperature.

Subsequently, the precipitated slurry may be coated on WC layer 202. The aqueous slurry of Cu—Mn/$Nb_2O_5$—$ZrO_2$ may be deposited on WC layer 202, employing vacuum dosing and coating systems. In the present disclosure, a plurality of capacities of OC loadings may be coated on WC layer 202. The plurality of OC loading may vary from about 60 g/L to about 200 g/L, in this disclosure particularly about 120 g/L. Subsequently, after deposition on WC layer 202 of suitable loadings of Cu—Mn/$Nb_2O_5$—$ZrO_2$ slurry, OC layer 204 may be dried and subsequently calcined at suitable temperature within a range of about 550° C. to about 650° C., preferably at about 600° C. for about 5 hours. Treatment of OC layer 204 may be enabled employing suitable drying and heating processes. A commercially-available air knife drying systems may be employed for drying OC layer 204. Heat treatments (calcination) may be performed using commercially-available firing (furnace) systems.

OC layer 204 deposited on WC layer 202 may have a chemical composition with a total loading of about 120 g/L, including a Cu—Mn spinel structure with copper loading of about 10 g/L to about 15 g/L and manganese loading of about 20 g/L to about 25 g/L. The $Nb_2O_5$—$ZrO_2$ support oxide may have loadings of about 80 g/L to about 90 g/L.

Figure 3:
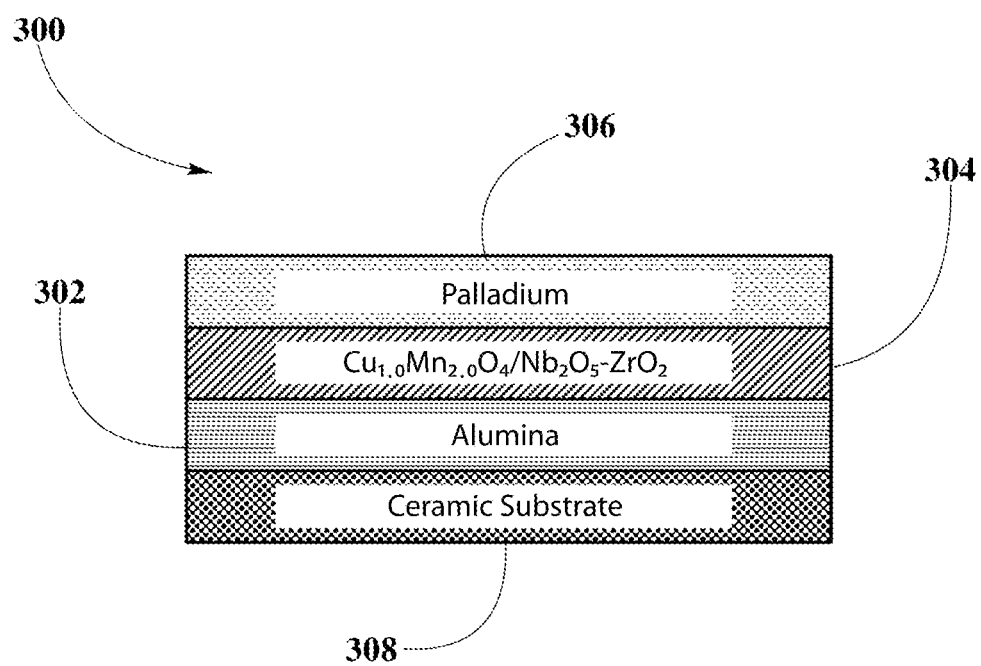
FIG. 3 depicts a SPGM catalyst system configuration referred as SPGM catalyst system Type 3, according to an embodiment.

FIG. 3 depicts catalyst structure 300 for SPGM catalyst system Type 3. In the present embodiment, WC layer 302 may only include alumina-based support. The preparation of WC layer 302 may begin by milling the alumina-based support oxide to make an aqueous slurry. Then, the resulting slurry may be coated as WC layer 302 on ceramic substrate 308, using a cordierite material with honeycomb structure, where ceramic substrate 308 may have a plurality of channels with suitable porosity. The WC loading is about 120 g/L and subsequently dry and fired at about 550° C. for about 4 hours. WC layer 302 may be deposited on ceramic substrate 308 employing vacuum dosing and coating systems.

OC layer 304 may include Cu—Mn stoichiometric spinel structure, $Cu_{1.0}Mn_{2.0}O_4$, supported on $Nb_2O_5$—$ZrO_2$ by using co-precipitation method or any other preparation technique known in the art.

The preparation of OC layer 304 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on $Nb_2O_5$—$ZrO_2$ support oxide aqueous slurry, which may have added thereto an appropriate base solution, such as in order to adjust the pH of the slurry to a suitable range. The precipitated slurry may be aged for a period of time of about 12 to 24 hours under continued stirring at room temperature. After aging, Cu—Mn/$Nb_2O_5$—$ZrO_2$ slurry may be coated as OC layer 304. In the present disclosure, a plurality of capacities of OC loadings may be coated on WC layer 302. The plurality of OC loading may vary from about 60 g/L to about 200 g/L, in this disclosure particularly about 120 g/L, to include the Cu—Mn spinel structure with copper loading of about 10 g/L to about 15 g/L and manganese loading of about 20 g/L to about 25 g/L. The $Nb_2O_5$—$ZrO_2$ support oxide may have loadings of about 80 g/L to about 90 g/L.

OC layer 304 may be dried and subsequently calcined at suitable temperature within a range of about 550° C. to about 650° C., preferably at about 600° C. for about 5 hours. Treatment of OC layer 304 may be enabled employing suitable drying and heating processes. A commercially-available air knife drying systems may be employed for drying OC layer 304. Heat treatments (calcination) may be performed using commercially-available firing (furnace) systems.

Subsequently, IMP layer 306 may be prepared with a solution of Pd nitrate which may be wet impregnated on top of WC layer 302 and OC layer 304 for drying and firing at about 550° C. for about 4 hours to complete catalyst structure 300. The final loading of Pd in the catalyst system may be within a range from about 0.5 g/ft$^3$ to about 10 g/ft$^3$. In the present embodiment, Pd loading is about 6 g/ft$^3$.

Figure 4:
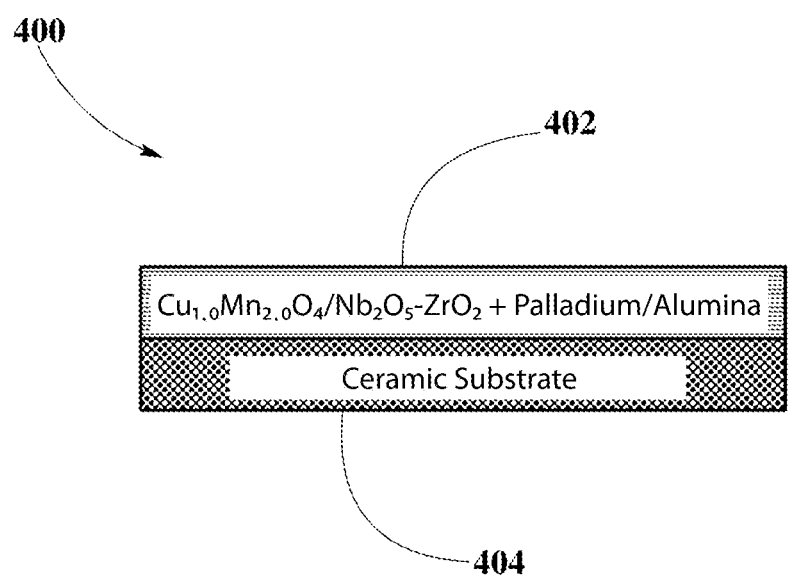
FIG. 4 illustrates a SPGM catalyst system configuration referred as SPGM catalyst system Type 4, according to an embodiment.

FIG. 4 illustrates catalyst structure 400 for SPGM catalyst system Type 4. In this system configuration, WC layer 402 may include Cu—Mn stoichiometric spinel structure, $Cu_{1.0}Mn_{2.0}O_4$, supported on $Nb_2O_5$—$ZrO_2$ and PGM supported on alumina by using co-precipitation method or any other preparation technique known in the art.

The preparation of WC layer 402 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on $Nb_2O_5$—$ZrO_2$ support oxide aqueous slurry, which may have added thereto an appropriate base solution, such as in order to adjust the pH of the slurry to a suitable range. The precipitated slurry may be aged for a period of time of about 12 to 24 hours under continued stirring at room temperature.

After precipitation step, the Cu—Mn/$Nb_2O_5$—$ZrO_2$ slurry may undergo filtering and washing, then the resulting material may be dried overnight at about 120° C. and subsequently calcined at suitable temperature within a range of about 550° C. to about 650° C., preferably at about 600° C. for about 5 hours. The prepared Cu—Mn/$Nb_2O_5$—$ZrO_2$ powder may be ground to fine grain powder to be added to Pd and alumina included in WC layer 402.

Fine grain powder of Cu—Mn/$Nb_2O_5$—$ZrO_2$ may be subsequently added to a combination of Pd and alumina-based support oxide slurry. The preparation of the Pd and alumina slurry may begin by milling the alumina-based support oxide separately to make an aqueous slurry. Subsequently, a solution of Pd nitrate may then be mixed with the aqueous slurry of alumina with a loading within a range from about 0.5 g/ft$^3$ to about 10 g/ft$^3$. In the present embodiment, Pd loading is about 6 g/ft$^3$ and total loading of WC material is 120 g/L. After mixing of Pd and alumina slurry, Pd may be locked down with an appropriate amount of one or more base solutions, such as sodium hydroxide (NaOH) solution, sodium carbonate ($Na_2CO_3$) solution, ammonium hydroxide ($NH_4OH$) solution, tetraethyl ammonium hydroxide (TEAH) solution, amongst others. No pH adjustment is required. In the present embodiment, Pd may be locked down using a base solution of tetraethyl ammonium hydroxide (TEAH). Then the resulting slurry, including fine grain powder of Cu—Mn/$Nb_2O_5$—$ZrO_2$, may be aged from about 12 hours to about 24 hours for subsequent coating as WC layer 402. The aged slurry may be coated on ceramic substrate 404, using a cordierite material with honeycomb structure, where ceramic substrate 404 may have a plurality of channels with suitable porosity. The aqueous slurry of Cu—Mn/$Nb_2O_5$—$ZrO_2$ and Pd/Alumina may be deposited on ceramic substrate 404 to form WC layer 402, employing vacuum dosing and coating systems. In the present disclosure, a plurality of capacities of WC loadings may be coated on ceramic substrate 404. The plurality of WC loading may vary from about 60 g/L to about 200 g/L, in this disclosure particularly about 120 g/L.

Treatment of WC layer 402 may be enabled employing suitable drying and heating processes. A commercially-available air knife drying systems may be employed for drying WC layer 402. Heat treatments (calcination) may be performed using commercially-available firing (furnace) systems.

WC layer 402 deposited on ceramic substrate 404 may have a chemical composition with a total loading of about 120 g/L, including a Cu—Mn spinel structure with copper loading of about 10 g/L to about 15 g/L, manganese loading of about 20 g/L to about 25 g/L, and Pd loading of about 6 g/$ft^3$.

According to principles in the present disclosure, the optimal NO/CO cross over R value of disclosed SPGM catalyst system may be determined by performing isothermal steady state sweep tests, employing fresh and hydrothermally aged catalyst samples prepared according to embodiments in the present disclosure, as described in FIG. 1, FIG. 2, FIG. 3, and FIG. 4. The isothermal steady state sweep tests may be developed at a selected inlet temperature using an 11-point R-value from rich condition to lean condition at a plurality of space velocities. Results from sweep tests may be compared to show the optimal composition and configuration of the disclosed SPGM catalyst system for optimal performance under TWC condition.

Isothermal Steady State Sweep Test Procedure

The isothermal steady state sweep test may be carried out employing a flow reactor at inlet temperature of about 450° C., and testing a gas stream at 11-point R values from about 2.0 (rich condition) to about 0.80 (lean condition) to measure the CO, NO, and HC conversions.

The space velocity (SV) in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, 10% of $CO_2$, and 10% of $H_2O$. The quantity of $O_2$ in the gas mix may be varied to adjust Air/Fuel (A/F) ratio.

TWC Standard Light-Off Test Procedures

TWC steady state light-off test may be carried out employing a flow reactor in which temperature may be increased from about 100° C. to about 500° C. at a rate of about 40° C./min, feeding a gas composition of 8,000 ppm of CO, 400 ppm of $C_3H_6$, 100 ppm of $C_3H_8$, 1,000 ppm of $NO_x$, 2,000 ppm of $H_2$, 10% of $CO_2$, 10% of $H_2O$, and 0.7% of $O_2$. The average R-value is 1.05 (stoichiometric), at SV of about 40,000 $h^{-1}$.

TWC standard oscillating light-off test may be carried out employing a flow reactor in which temperature may be increased from about 100° C. to about 500° C. at a rate of about 40° C./min, feeding a gas composition of 8,000 ppm of CO, 400 ppm of $C_3H_6$, 100 ppm of $C_3H_8$, 1,000 ppm of $NO_x$, 2,000 ppm of $H_2$, 10% of $CO_2$, 10% of $H_2O$, and $O_2$ quantity is variable between 0.3% to 0.45% for oscillating. The average R-value is 1.05 (stoichiometric) at SV of about 90,000 $h^{-1}$. Oscillating light-off test may be conducted, under a frequency of about 1 Hz with ±0.4 A/F ratio span.

TWC Performance of SPGM Catalyst Systems

Figure 5:
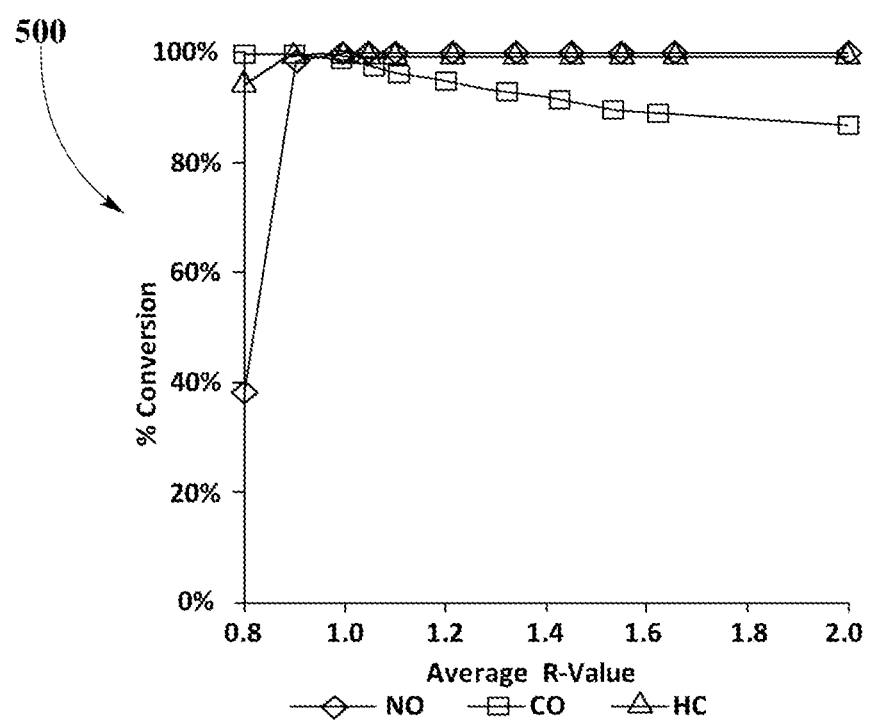
FIG. 5 shows TWC performance for fresh sample of SPGM catalyst system Type 1 under isothermal steady state sweep condition, at inlet temperature of about 450° C. and space velocity (SV) of about 40,000 $h^{-1}$, according to an embodiment.

FIG. 5 shows TWC performance 500 for fresh SPGM catalyst sample Type 1 under isothermal steady state sweep condition, at inlet temperature of about 450° C. and space velocity (SV) of about 40,000 $h^{-1}$, according to an embodiment.

As may be seen in FIG. 5, in fresh samples, NO/CO cross over takes place at the specific R-value of 0.950. The NO/CO cross over for typical PGM catalyst takes place at stoichiometric R-value (approximately 1.00), however SPGM catalyst system Type 1 presents R-value below stoichiometric condition which is indicative of 100% conversion of NO and CO under lean condition of stoichiometric (R=0.950). $NO_x$ conversion under lean condition of stoichiometric is very high. As can be seen at R-value=0.9, $NO_x$ conversion is approximately 96%.

Figure 6:
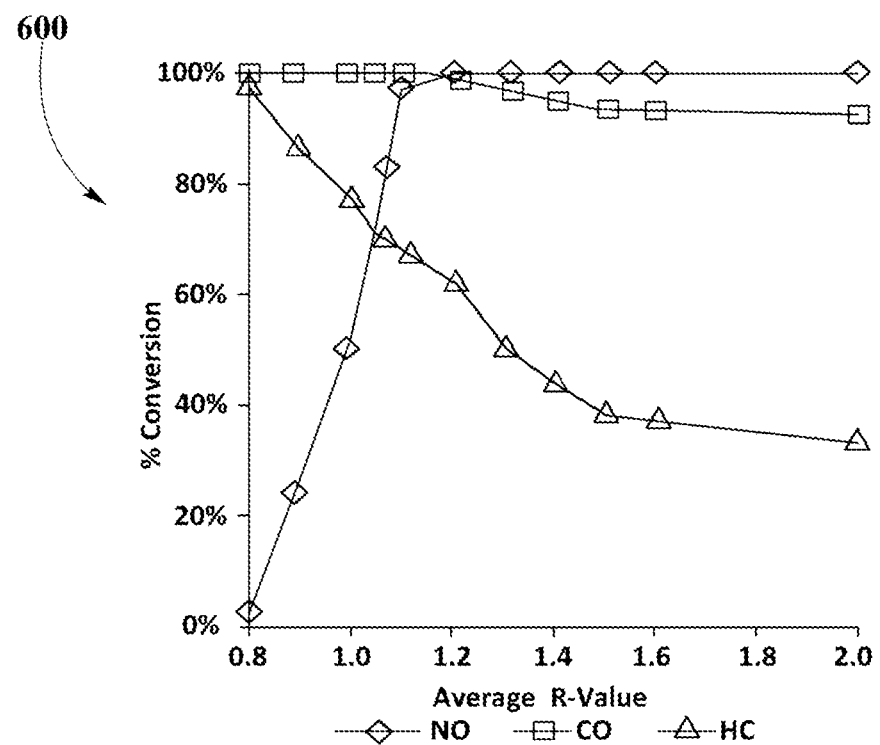
FIG. 6 depicts TWC performance for fresh sample of SPGM catalyst system Type 2 under isothermal steady state sweep condition, at inlet temperature of about 450° C. and SV of about 40,000 $h^{-1}$, according to an embodiment.

FIG. 6 depicts TWC performance 600 for fresh SPGM catalyst sample Type 2 under isothermal steady state sweep condition, at inlet temperature of about 450° C. and SV of about 40,000 $h^{-1}$, according to an embodiment.

As may be seen in FIG. 6, in fresh samples, NO/CO cross over takes place at the specific R-value of 1.160, where the fresh NO/CO conversion is 99.6%.

Figure 7:
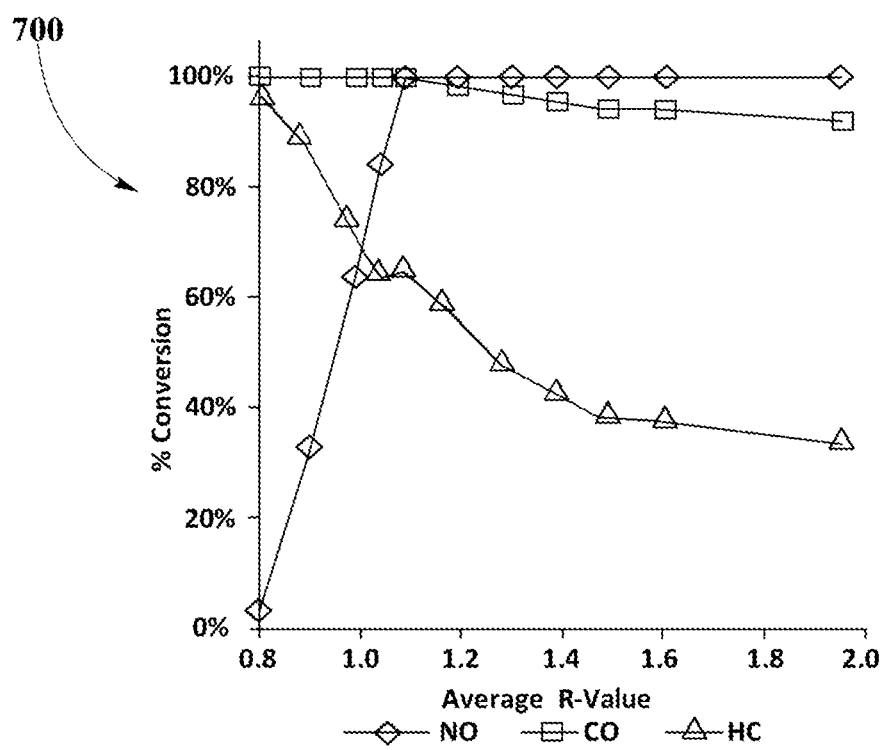
FIG. 7 illustrates TWC performance for fresh sample of SPGM catalyst system Type 3 under isothermal steady state sweep condition, at inlet temperature of about 450° C. and SV of about 40,000 $h^{-1}$, according to an embodiment.

FIG. 7 illustrates TWC performance 700 for fresh SPGM catalyst sample Type 3 under isothermal steady state sweep condition, at inlet temperature of about 450° C. and SV of about 40,000 $h^{-1}$, according to an embodiment.

As may be seen in FIG. 7, in fresh samples, NO/CO cross over takes place at the specific R-value of 1.099, where the fresh NO/CO conversion is 100%. It may be observed that this NO/CO cross over takes place under stoichiometric condition tending slightly to rich condition. A typical PGM catalyst has R-value of 1.00.

Figure 8:
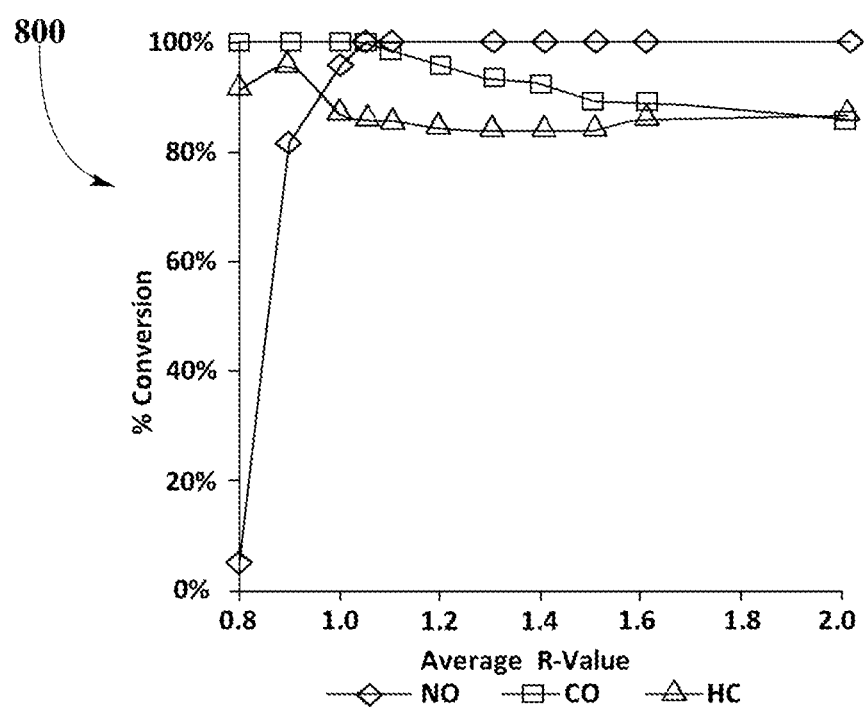
FIG. 8 shows TWC performance for fresh sample of SPGM catalyst system Type 4 under isothermal steady state sweep condition, at inlet temperature of about 450° C. and SV of about 40,000 $h^{-1}$, according to an embodiment.

FIG. 8 illustrates TWC performance 800 for fresh SPGM catalyst sample Type 4 under isothermal steady state sweep condition, at inlet temperature of about 450° C. and SV of about 40,000 $h^{-1}$, according to an embodiment.

As may be seen in FIG. 8, in fresh samples, NO/CO cross over takes place at the specific R-value of 1.044, where the fresh NO/CO conversion is 100%. It may be observed that this NO/CO cross over is very close to stoichiometric condition and trend slightly under rich condition. A typical PGM catalyst has R-value of 1.00. $NO_x$ conversion under lean condition of stoichiometric is large. As can be seen, at R-value=0.9, $NO_x$ conversion is approximately 82%.

In present disclosure, the resulting respective R-values for SPGM catalyst systems under steady state sweep condition indicate that disclosed SPGM catalyst systems shows optimal performance because the NO/CO cross over R-value is very close to stoichiometric condition and in case of SPGM catalyst system Type 1, the R-value of 0.95 is indicative of 100% NO and CO conversions under lean condition.

TWC Performance Comparison of SPGM and PGM Catalyst Systems

Figure 9:
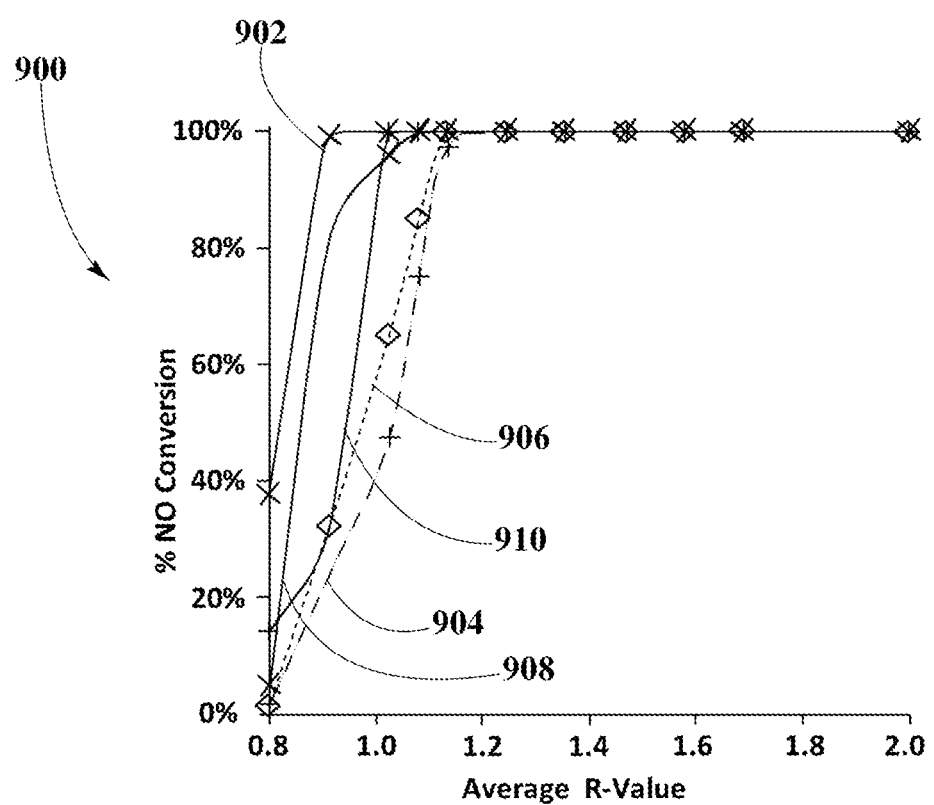
FIG. 9 depicts performance comparison in NO conversion for fresh samples of SPGM catalyst systems Type 1, Type 2, Type 3, Type 4, and PGM catalyst under isothermal steady state sweep condition, at inlet temperature of about 450° C. and SV of about 40,000 $h^{-1}$, according to an embodiment.

FIG. 9 depicts performance comparison 900 in NO conversion for fresh samples of SPGM catalyst systems Type 1, Type 2, Type 3, Type 4, and commercial PGM catalyst under isothermal steady state sweep condition, at inlet temperature of about 450° C. and SV of about 40,000 h$^{-1}$, according to an embodiment.

The isothermal steady state sweep test may be carried out employing a flow reactor at the inlet temperature of about 450° C. to simulate exhaust of standard TWC gas composition with variable O$_2$ to adjust A/F ratio, employing 11-point R values from about 2.0 (rich condition) to about 0.80 (lean condition), to measure NO conversion.

In this embodiment, the fresh sample of commercial PGM catalyst may be a catalyst including OC layer of Pd loading of about 6 g/ft$^3$ and Rhodium (Rh) loading of about 6 g/ft$^3$ with alumina based support oxide and about 30% to about 40% by weight of oxygen storage material. WC layer include only alumina based support oxide and oxygen storage material.

In performance comparison 900, NO conversion curve 902 shows performance of fresh sample of SPGM catalyst system Type 1, NO conversion curve 904 depicts performance of fresh sample of SPGM catalyst system Type 2, NO conversion curve 906 shows performance of fresh sample of SPGM catalyst system Type 3, NO conversion curve 908 depicts performance of fresh sample of SPGM catalyst system Type 4, and NO conversion curve 910 shows performance of fresh sample of commercial PGM catalyst, all under steady state sweep condition.

As may be observed in performance comparison 900, there is an improved performance in NO conversion for SPGM catalyst system Type 1 and SPGM catalyst system Type 4 under lean condition of stoichiometric as compared to PGM catalyst. This improved performance is the result of the synergistic effect between the PGM components and the Cu—Mn spinel components in the respective compositions of both SPGM catalyst systems, in which adding of Cu—Mn spinel components is responsible for the improved performance of NO conversion under lean condition compared with the level of NO conversion of the PGM catalyst shown in NO conversion curve 910. SPGM catalyst systems Type 1 and Type 4 may perform better than PGM catalyst because of their improved NO conversion under lean condition. For example, at R=0.9, while SPGM catalyst system Type 1 shows NO conversion of 96%, SPGM catalyst system Type 4 shows NO conversion of 82%, the PGM catalyst shows a NO conversion of 38%. In addition both SPGM catalyst system Type 1 and Type 4 presents NO conversion at R-value less than 1.00, which is the typical R-value for PGM catalysts.

Figure 10:
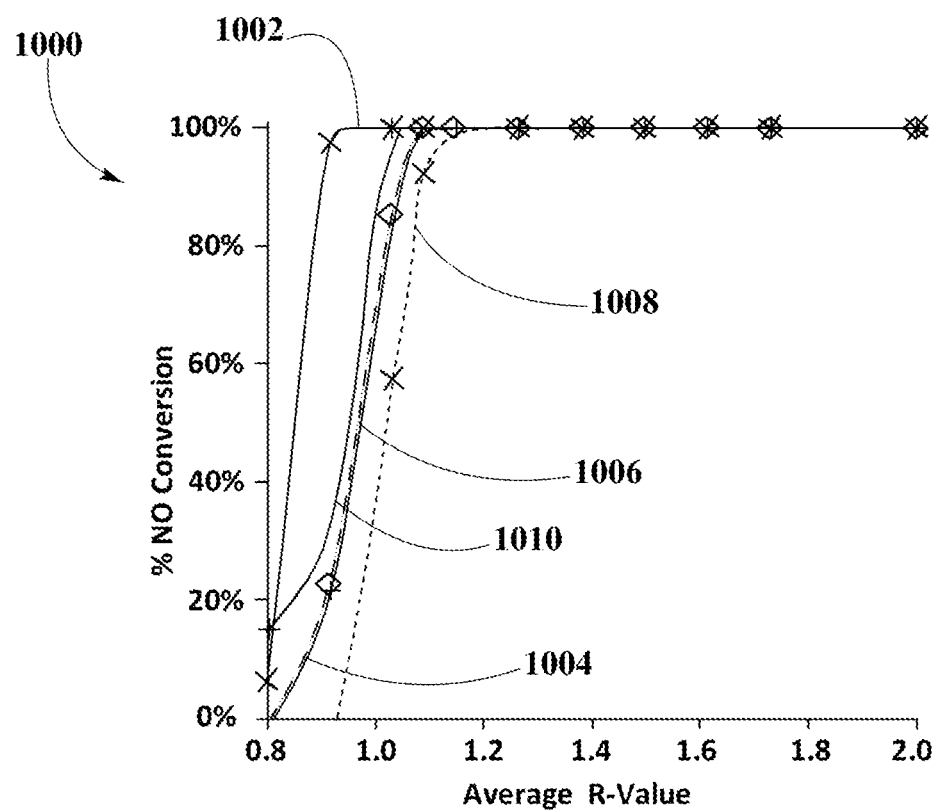
FIG. 10 illustrates performance comparison in NO conversion for hydrothermally aged samples of SPGM catalyst systems Type 1, Type 2, Type 3, Type 4, and PGM catalyst under isothermal steady state sweep condition, at inlet temperature of about 450° C. and SV of about 40,000 $h^{-1}$, according to an embodiment.

FIG. 10 illustrates performance comparison 1000 in NO conversion for hydrothermally aged samples of SPGM catalyst systems Type 1, Type 2, Type 3, Type 4, and commercial PGM catalyst under isothermal steady state sweep condition, at inlet temperature of about 450° C. and SV of about 40,000 h$^{-1}$, according to an embodiment.

In this embodiment, the fresh sample of commercial PGM catalyst may be a catalyst including OC layer of Pd loading of about 6 g/ft$^3$ and Rhodium (Rh) loading of about 6 g/ft$^3$ with alumina based support oxide and about 30% to 40% by weight of oxygen storage material. WC layer include only alumina based support oxide and oxygen storage material.

Samples of SPGM catalyst systems Type 1, Type 2, Type 3, Type 4, and commercial PGM catalyst may be hydrothermally aged employing about 10% steam/air or fuel flow at a plurality of temperatures within a range from about 800° C. to about 1,000° C. for about 4 hours. In this embodiment, all samples may be preferably aged at 900° C. for about 4 hours.

The isothermal steady state sweep test may be carried out employing a flow reactor at the inlet temperature of about 450° C. to simulate exhaust of standard TWC gas composition with variable O$_2$ to adjust A/F ratio, employing 11-point R values from about 2.0 (rich condition) to about 0.80 (lean condition) to measure NO conversions.

In performance comparison 1000, NO conversion curve 1002 shows performance of fresh sample of SPGM catalyst system Type 1, NO conversion curve 1004 depicts performance of fresh sample of SPGM catalyst system Type 2, NO conversion curve 1006 shows performance of fresh sample of SPGM catalyst system Type 3, NO conversion curve 1008 depicts performance of fresh sample of SPGM catalyst system Type 4, and NO conversion curve 1010 shows performance of fresh sample of commercial PGM catalyst, all under steady state sweep condition.

As may be observed in performance comparison 1000, there is an improved performance in NO conversion for SPGM catalyst system Type 1 after aging under lean of stoichiometric as compared to PGM catalyst. This improved performance is the result of the synergistic effect between the PGM components and the Cu—Mn spinel components in the respective compositions of SPGM catalyst system Type 1, in which adding of Cu—Mn spinel is responsible for the improved performance of NO conversion when compared with the level of NO conversion of the PGM catalyst shown in NO conversion curve 1010. For example, at R-value=0.9, SPGM catalyst system Type 1 shows NO conversion of 95%, while PGM catalyst shows NO conversion of 35%.

In addition, as may be seen from performance comparison 900 and performance comparison 1000, the optimal performance in NO conversion was obtained with fresh and aged samples of SPGM catalyst system Type 1, showing improved NO conversion under lean region (R-value<1.00). NO/CO cross over R-values for SPGM catalyst system Type 1 are 0.950 and 0.965 for fresh and hydrothermally aged samples respectively indicating enhanced performance under lean condition when compared to PGM catalyst samples. NO/CO cross over R-values for PGM catalyst are 0.998 and 1.000 for fresh and hydrothermally aged samples respectively.

The NO/CO cross over R-values obtained under isothermal steady state sweep condition for fresh and hydrothermally aged samples of SPGM catalyst systems Type 1, Type 2, Type 3, and Type 4, and PGM catalyst may confirm the optimal performance of SPGM catalyst systems Type 1 when compared to the other SPGM catalyst systems and PGM catalyst in the present disclosure, since NO/CO cross over R-values for fresh and hydrothermally aged samples SPGM catalyst system Type 1 are below the NO/CO cross over R-values for fresh and hydrothermally aged samples of PGM catalyst, indicating that SPGM catalyst systems Type 1 is an improvement in which the synergistic effect, shown according to the principles of the present disclosure, is very relevant. Additionally, SPGM catalyst system Type 1 shows a significant improvement of NO conversion in lean condition compare to PGM catalyst.

As may be observed, SPGM catalyst systems Type 2, Type 3, and Type 4 show increasing R-value after aging. The R-values obtained indicate that they may perform under stoichiometric condition or slightly under rich condition cross over. However, SPGM catalyst system Type 1 shows significant improvement toward lean condition that surpasses performance of PGM catalyst because of high NO conversion realized under lean condition, which may also lead to lower fuel consumption.

TWC Standard Light-Off Test for SPGM Catalyst System Type 1

Figure 11A:
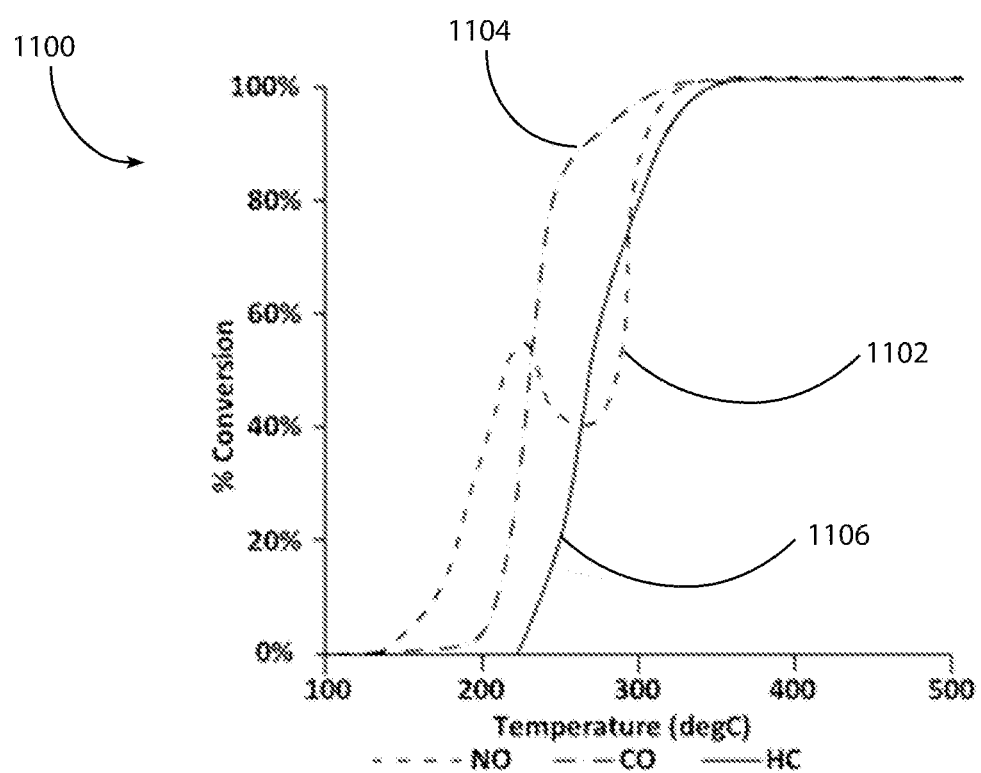
FIG. 11 shows comparison of TWC standard light-off test results for fresh sample of SPGM catalyst system Type 1 under steady state condition at SV of about 40,000 $h^{-1}$, and R-value of about 1.05 (FIG. 11A), and under oscillating condition with frequency signal of about 1 Hz, SV of about 90,000 $h^{-1}$, and R-value of about 1.05 (FIG. 11B), according to an embodiment.
Figure 11B:
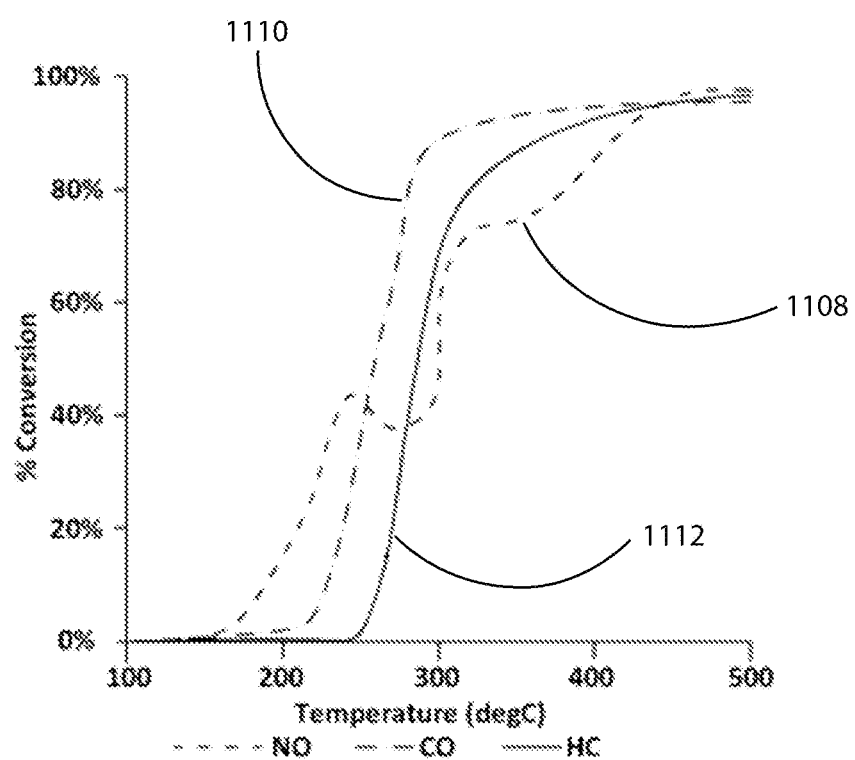

FIG. 11 shows activity comparison 1100 of results from TWC standard light-off test performed for fresh sample of SPGM catalyst system Type 1 under isothermal steady state condition, at SV of about 40,000 h$^{-1}$ and R value of about 1.05 (FIG. 11A), and under oscillating condition at SV of about 90,000 h$^{-1}$ and R value of about 1.05, with frequency signal of about 1 Hz and ±0.4 A/F ratio span (FIG. 11B), according to an embodiment.

In FIG. 11A, NO conversion curve has been designated with a dashed line as NO curve 1102, CO conversion curve has been designated with a dot-dash line as CO curve 1104, and HC conversion curve has been designated with solid line as HC curve 1106. In FIG. 11B, NO conversion curve has been designated with a dashed line as NO curve 1108, CO conversion curve has been designated with a dot-dash line as CO curve 1110, and HC conversion curve has been designated with solid line as HC curve 1112.

As may be seen, under steady state light-off test, in NO curve 1102, 50% conversion of NO occurs at $T_{50}$ of about 211.9° C., in CO curve 1104, 50% conversion of CO occurs at $T_{50}$ of about 228.1° C., and in HC curve 1106, 50% conversion of HC occurs at $T_{50}$ of about 265.9° C. Under oscillating light-off test, in NO curve 1108, 50% conversion of NO occurs at $T_{50}$ of about 295.4° C., in CO curve 1110, 50% conversion of CO occurs at $T_{50}$ of about 257.3° C., and in HC curve 1112, 50% conversion of HC occurs at $T_{50}$ of about 286.9° C.

Comparison of conversion results from FIG. 11A and FIG. 11B, shows SPGM Type 1 catalyst system shows high NO/CO/HC conversion and $T_{50}$ conversion of all pollutants occurs below 300° C., however the higher $T_{50}$ of all pollutants in FIG. 11B is due to higher SV used for testing of SPGM catalyst system Type 1 under oscillating light-off condition.

According to principles in the present disclosure, application of Pd on alumina-based support as overcoat and Cu—Mn stoichiometric spinel structure, $Cu_{1.0}Mn_{2.0}O_4$, supported on $Nb_2O_5$—$ZrO_2$ as washcoat on ceramic substrate, produced higher catalytic activity, efficiency, and better performance in TWC condition specially under same condition as compared with commercial PGM catalysts. The low level of temperatures $T_{50}$ obtained and higher NO conversion under lean condition for fresh and aged SPGM samples may also show improved performance and thermal stability of SPGM catalyst system. The catalyst system configuration, material composition, and preparation of SPGM catalyst system Type 1 may be selected as an optimal catalyst system to be used in many TWC applications.

The catalyst system configuration, material composition, and preparation of SPGM catalyst system Type 1 may provide an optimal selection for lean performance as a result of the synergistic relation between Pd and Cu—Mn stoichiometric spinel structure, a cooperative behavior that produces higher catalytic activity.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalyst system, comprising:
    at least one substrate;
    at least one washcoat comprising at least one oxygen storage material further comprising Cu—Mn spinel having a niobium-zirconia support oxide; and
    at least one overcoat comprising at least one platinum group metal catalyst and $Al_2O_3$.

2. The catalyst system of claim 1, wherein the Cu—Mn spinel comprises $CuMn_2O_4$.

3. The catalyst system of claim 1, wherein the Cu—Mn spinel is stoichiometric.

4. The catalyst system of claim 1, wherein the niobium-zirconia support oxide comprises $Nb_2O_5$—$ZrO_2$.

5. The catalyst system of claim 1, further comprising at least one impregnation layer.

6. The catalyst of claim 1, wherein the at least one substrate comprises a ceramic.

7. The catalyst of claim 1, wherein NO is reduced under lean exhaust conditions.

8. The catalyst of claim 1, wherein CO is reduced under lean exhaust conditions.

9. The catalyst of claim 1, wherein NO is reduced by greater than 95% under lean exhaust conditions.

10. The catalyst of claim 1, wherein the reduction of NO is improved over a catalyst system comprising at least one platinum group metal catalyst and no Cu—Mn spinel.

11. A catalyst system, comprising:
    at least one substrate;
    at least one washcoat comprising at least one platinum group metal catalyst and $Al_2O_3$; and
    at least one overcoat comprising at least one oxygen storage material further comprising Cu—Mn spinel having a niobium-zirconia support oxide.

12. The catalyst system of claim 11, wherein the Cu—Mn spinel comprises $CuMn_2O_4$.

13. The catalyst system of claim 11, wherein the Cu—Mn spinel is stoichiometric.

14. The catalyst system of claim 11, wherein the niobium-zirconia support oxide comprises $Nb_2O_5$—$ZrO_2$.

15. The catalyst system of claim 11, further comprising at least one impregnation layer.

16. The catalyst of claim 11, wherein the at least one substrate comprises a ceramic.

17. The catalyst of claim 11, wherein NO is reduced under lean exhaust conditions.

18. The catalyst of claim 11, wherein CO is reduced under lean exhaust conditions.

19. The catalyst of claim 11, wherein the reduction of NO is improved over a catalyst system comprising at least one platinum group metal catalyst and no Cu—Mn spinel.

20. A catalyst system, comprising:
    at least one substrate comprising ceramics;
    at least one washcoat comprising $Al_2O_3$;
    at least one overcoat comprising at least one oxygen storage material further comprising Cu—Mn spinel having a niobium-zirconia support oxide; and
    at least one impregnation layer comprising at least one platinum group metal catalyst;
    wherein the at least one platinum group metal catalyst comprises palladium.

* * * * *

UNITED STATES PATENT AND TRADEMARK OFFICE
CERTIFICATE OF CORRECTION

| | | |
|---|---|---|
| PATENT NO. | : 9,511,355 B2 | Page 1 of 1 |
| APPLICATION NO. | : 14/090861 | |
| DATED | : December 6, 2016 | |
| INVENTOR(S) | : Nazarpoor | |

It is certified that error appears in the above-identified patent and that said Letters Patent is hereby corrected as shown below:

On the Title Page

Item (73) Assignee: "Clean Diesel Technologies, Inc. (CDTI), Oxnard, CA (US)" should read --Clean Diesel Technologies, Inc., Oxnard, CA (US)--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*